United States Patent [19]
Booth

[11] Patent Number: 5,667,271
[45] Date of Patent: Sep. 16, 1997

[54] SNAP-IN ATTACHMENT CLIP FOR PLASTIC PANEL

[75] Inventor: Thomas C. Booth, Roseville, Mich.

[73] Assignee: Chrysler Corporation, Auburn Hills, Mich.

[21] Appl. No.: 404,848

[22] Filed: Mar. 15, 1995

[51] Int. Cl.$^6$ .................................................. B62D 25/08
[52] U.S. Cl. ............................................. 296/192; 24/295
[58] Field of Search ...................... 296/191, 195, 296/192; 24/289, 293, 295

[56] References Cited

U.S. PATENT DOCUMENTS

| | | |
|---|---|---|
| 1,930,187 | 10/1933 | Abroanske . |
| 2,654,411 | 10/1953 | Bedford, Jr. . |
| 2,748,906 | 6/1956 | Flora . |
| 2,781,073 | 2/1957 | Trafton . |
| 2,824,465 | 2/1958 | Riley, Jr. . |
| 3,463,432 | 8/1969 | Ptak . |
| 3,845,983 | 11/1974 | Heintz ........................... 296/192 |
| 4,466,654 | 8/1984 | Abe ................................ 296/192 |
| 4,521,050 | 6/1985 | Rea et al. ..................... 296/192 |
| 4,729,706 | 3/1988 | Peterson et al. . |
| 4,850,639 | 7/1989 | Gorski ....................... 296/191 X |
| 5,036,586 | 8/1991 | Glickenberger ........... 296/192 X |
| 5,297,845 | 3/1994 | Smartt et al. ................. 296/191 |
| 5,526,553 | 6/1996 | Klein ............................... 24/295 |

FOREIGN PATENT DOCUMENTS

| | | | |
|---|---|---|---|
| 14576 | 1/1984 | Japan ............................ | 296/192 |

*Primary Examiner*—Joseph D. Pape
*Attorney, Agent, or Firm*—Thomas G. Pasternak

[57] ABSTRACT

A U-shaped edge attachment clip adapted for securing each outboard end of a plastic panel to an associated vehicle body side panel downwardly offset horizontally disposed flange. Each flange free edge includes a pair of longitudinally spaced cutouts. Each attachment clip, of resilient sheet material, has an elongate, generally U-shaped bifurcated configuration defining an upper contoured leg and a lower planar leg having their proximate ends joined by a bight wall. The upper leg is formed with inner and outer longitudinally spaced pairs of spring tangs matching lower leg underling end tab portions and a center elongated tab portion adapted to grip the flange. The longitudinally spaced upper tangs and lower tab portions define a pair of matching clip upper and lower leg end notches which, when aligned with associated flange cutouts, are adapted to receive panel integral snap-in locking prongs. An integral leaf spring on the clip is adapted to resiliently biases a depending end wall of the plastic panel upwardly upon engagement of the prongs, thereby positioning the plastic panel exterior surface in flush relation with adjacent an portion of the body panel. The clips and their associated panel cutouts allow the plastic panel freedom to thermally expand outboard. The plastic panel is readily removed by sliding each clip inboard from its respective body flange thereby releasing its associated plastic panel locking prongs.

9 Claims, 2 Drawing Sheets

SNAP-IN ATTACHMENT CLIP FOR PLASTIC PANEL

BACKGROUND OF THE INVENTION

This invention relates to resilient fastening clips and more particularly to a one-piece edge attachment resilient fastening clip arrangement for securing, in a flush manner, a plastic panel to a sheet metal vehicle body panel while eliminating fasteners in the panel styling surfaces.

The prior art is replete with resilient metal clip fastening or retaining arrangements. The U.S. Pat. No. 4,729,706 issued Mar. 8, 1988 to Peterson et al. discloses a fastener clip having two legs adapted to be pushed onto an edge of sheet materials of varying thicknesses. The clip first leg has a U-shaped elongated tongue cut from it and bent towards the second leg to fictionally engage a sheet material disposed between the two legs while the second leg has an integral threaded barrel for receiving a bolt. The U-shaped tongue is formed with offset bends to allow the tongue to yield when the clip is mounted on a thicker sheet material.

The following is a list of patents disclosing various types of resilient fastener clip arrangements; U.S. Pat. No. 1,930,187 issued Oct. 10, 1933 to A. F. Abroanske; U.S. Pat. No. 2,654,411 issued Oct. 6, 1953 to W. A. Bedford, Jr.; U.S. Pat. No. 2,748,906 issued Jun. 5, 1956 to L. H. Flora; U.S. Pat. No. 2,781,073 issued Feb. 12, 1957 to W. L. Trafton; U.S. Pat. No. 2,824,465 issued Feb. 25, 1958 to J. T. Riley, Jr.; and U.S. Pat. No. 3,463,432 issued Aug. 26, 1969 to W. F. Ptak.

SUMMARY OF THE INVENTION

It is a feature of the present invention to provide a resilient press-on edge attachment clip for securing a vehicle exterior plastic panel to an adjacent downwardly off-set flange of an exterior metal body panel wherein the plastic panel and body panel exterior styling surfaces are maintained in flush relation while the clip is subjacent the panels so as not to be visible from the vehicle exterior.

It is another feature of the present invention to provide a resilient press-on edge attachment clip which can be easily attached to a subjacent flange portion of a vehicle body metal panel while allowing the plastic panel to thermally expand and contract relative to the body panel.

In accordance with one specific embodiment of the present invention a pair of identical U-shaped edge attachment clips are adapted for securing opposite ends of a plastic cowl panel to associated transversely spaced apart front fender panels of a vehicle body. The fender panels have mirror image downturned portions terminating in inboard extending, horizontally disposed flanges defining longitudinally extending opposed flange edges. Each flange edge is formed with longitudinally spaced fore and aft rectangular-shaped cutouts. The one-piece clips, formed of a resilient sheet metal, are bent to an elongate U-shaped configuration providing an arcuate reverse-folded bight defining an upper contoured leg overlying a lower planar leg. The upper leg includes outer and inner longitudinally spaced apart pairs of independent spring tangs. The lower leg includes an outer end pair of tab portions disposed with parallel side edges in matched relation to an associated upper leg outer spring tang. The lower leg further includes a central elongated tab portion underlying the upper leg inner pair of tangs wherein each side edge of the central tab portion matches an outer side edge of its associated overlying tang. Further, each upper leg outer tang resiliently contacts an associated lower leg end tab portion while each upper leg inner pair of tangs resiliently contacts the central elongated tab portion.

The longitudinally spaced upper leg pairs of inner and outer tangs together with the lower leg tab portions define upper and lower leg end notches. Each clip is pressed-on its associated flange edge such that each end notch is centered on an associated flange cutout. The flange cutouts are oversized relative to the notches such that their parallel transverse side edges are spaced apart a predetermined dimension greater than the clip upper and lower leg end notches. Also, each flange cutout has its longitudinal edge recessed outboard from its associated attachment flange longitudinal free edge a predetermined dimension insuring sufficient clearance for plastic cowl panel thermal expansion.

Each clip end notches and aligned flange fore and aft cutouts are adapted to receive associated pairs of integral mirror image snap-in locking prongs which depend downwardly from opposite, vertically disposed plastic panel end walls. Thus, with a clip pressed-on each of the opposed body front fender flanges, an installer initially positions a plastic cowl panel transversely on the body with its associated locking prongs aligned with the clip end notches. Upon the installer pushing downwardly on the plastic panel each pair of prongs deflect, by virtue of their tapered edge faces riding over their respective clip end notch opposed side edges, wherein each pair of prongs spring-back with their horizontally disposed shoulder surfaces in locked contact with an undersurface of its associated clip lower leg.

Each clip upper leg has a central gap over which is integrally cantilevered a longitudinally extending upwardly bowed leaf spring. Upon locking engagement of the panel prongs the leaf spring 42 is compressed by an overlying horizontal edge of its associated plastic panel end wall. The clip spring is maintained under compression by the panel prongs whereby spring force reacts upwardly on the panel urging its upper design surface in flush relation with the adjacent exterior surface of the fender panel.

These and other features and advantages of the invention will be more fully understood from the following detailed description of the invention taken together with the accompanying drawings.

DETAILED DESCRIPTION OF THE INVENTION

Figure 1:
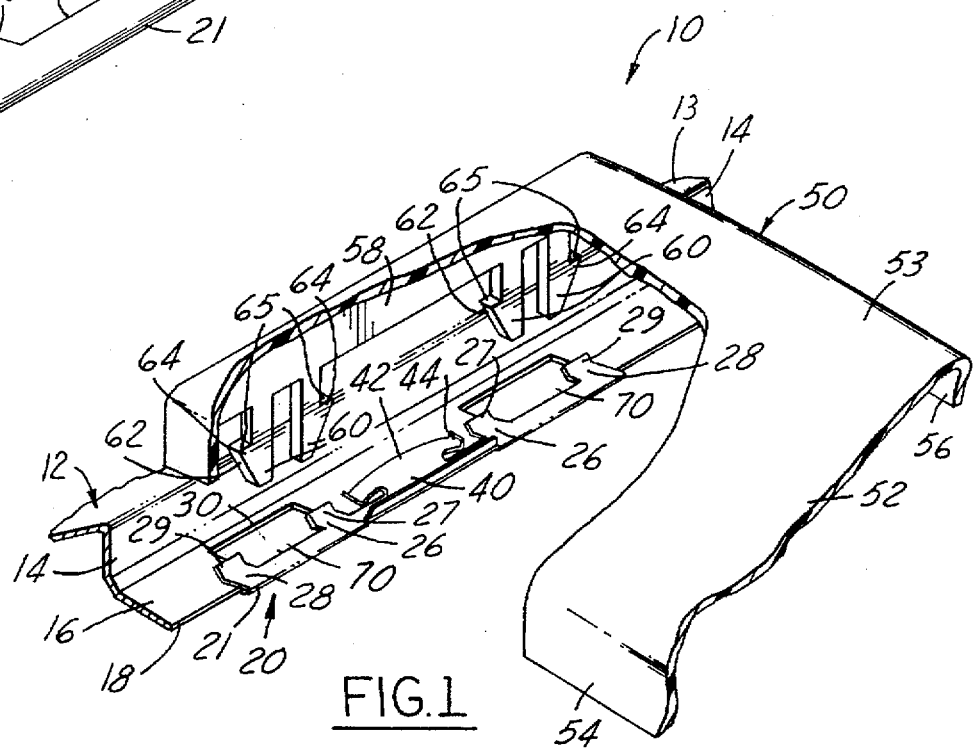
FIG. 1 is a fragmentary perspective view, partly broken away, of a portion of a vehicle metal fender panel showing an internal edge engaged by an attachment clip of the present invention together with an overlying plastic panel formed with a pair of depending locking prongs adapted to be snapped into fender flange cutouts.
Figure 6:
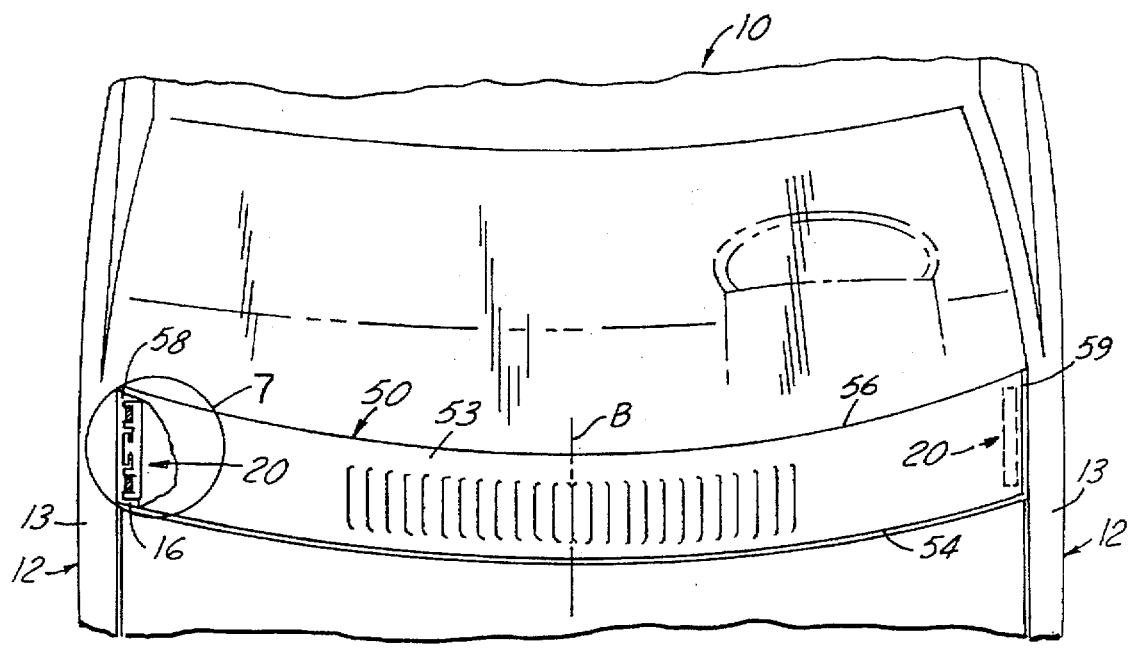
FIG. 6 is a fragmentary top view of a vehicle plastic cowl panel shown secured at each of its opposite outboard ends to an associated vehicle body metal fender panel flange by a snap-on clip in accordance with the present invention.

Referring now to the drawings and in particular to FIG. 6 a portion of a vehicle body, generally indicated at 10, is shown provided with right and left side sheet metal front fender panels 12 each having an exterior upper surface 13. As the fender panels 12 are mirror images of each other only the right side fender panel will be shown and described. With reference to FIG. 1 the right side fender panel 12 is formed with a longitudinally extending downturned flange portion 14 terminating in an inboard extending attachment flange 16. The attachment flange 16 extends in a horizontal plane normal to the downturned flange portion 14 defining a longitudinally extending free edge 18.

Figure 2:
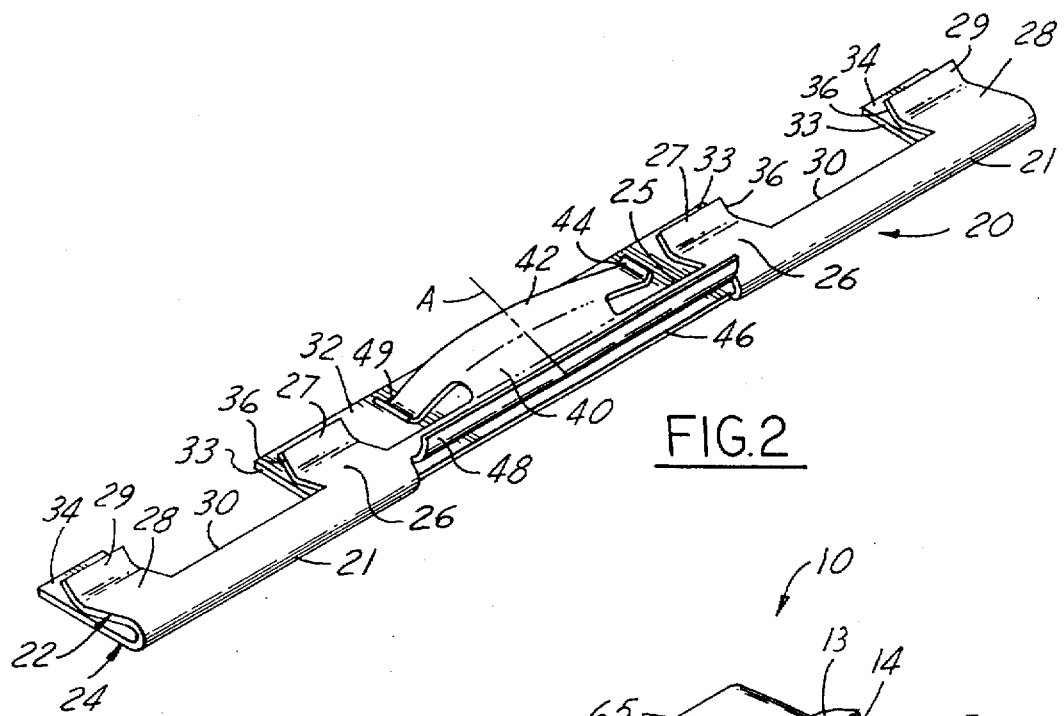
FIG. 2 is an enlarged perspective detail view of the attachment clip shown in FIG. 1.

An edge attachment clip, generally indicated at 20 in FIG. 2, comprises a resilient one piece sheet metal member formed to an elongate configuration. The attachment clip 20 is bent to provide a reverse folded bight 21, having an arcuate shape in cross section, defining an upper contoured leg 22 resiliently juxtaposed a lower planer leg 24. The upper leg 22 comprises an inner pair of outboard extending longitudinally spaced fore and aft tangs 26—26 defining a central elongated notched-out rectangular-shaped gap defined by transverse edge 25 therebetween. It will be noted that the clip is symmetrically disposed about a transversely extending clip plane of symmetry which includes the dashed construction line "A" in FIG. 2.

The first pair of outboard extending fore and aft mirror image inner spring tangs 26—26 each terminate in an upwardly inclined lead-in distal portion 27. The upper leg 22 has an outer second pair of outboard extending longitudinally spaced apart fore and aft end tangs 28—28 each terminating in an upwardly inclined lead-in distal portion 29. Each upper leg outer end tang 28 together with an associated one of the upper leg inner tang 26 define therebetween fore and aft rectangular-shaped upper end notches 30—30.

As seen in FIG. 2 the lower leg 24 comprises a central planar elongated tab portion 32, having side edges 33, symmetrically disposed about the clip axis "A". The clip lower leg 24 further comprises pair of outboard extending fore and aft end tabs 34—34 with each end tab having each of its parallel side edges in matched co-planar relation to associated parallel side edges of an overlying upper leg fore and aft end tang 28.

Figure 5:
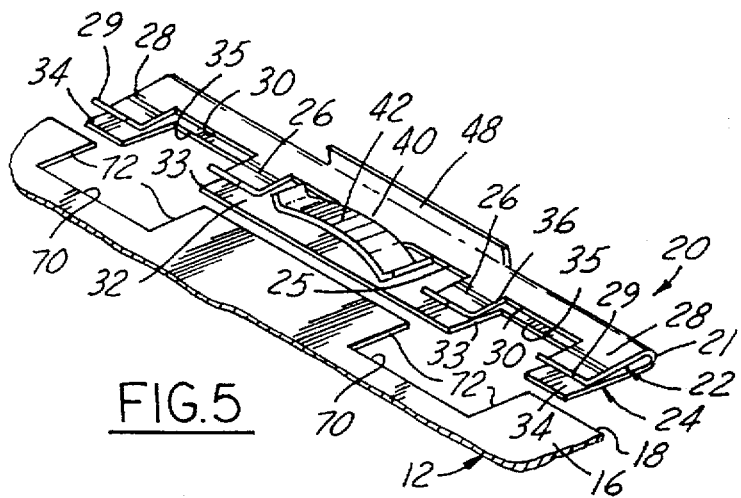
FIG. 5 is a fragmentary perspective view showing an attachment clip of the present invention in position for resiliently-engaging an edge of a fender panel flange.

With reference to FIG. 5 it will be seen that the clip 20 has mirror image rectangular-shaped lower leg end notches 35—35 the side edges 33—33 of which match associated side edges 36—36 of overlying upper leg end notches 30—30. It will be noted in FIG. 3 that the central plate portion 31 has a predetermined longitudinal dimension such that its inner side edges 33 match associated inner side edges 36 of the upper leg interior pair of tangs 26—26.

Figure 3:
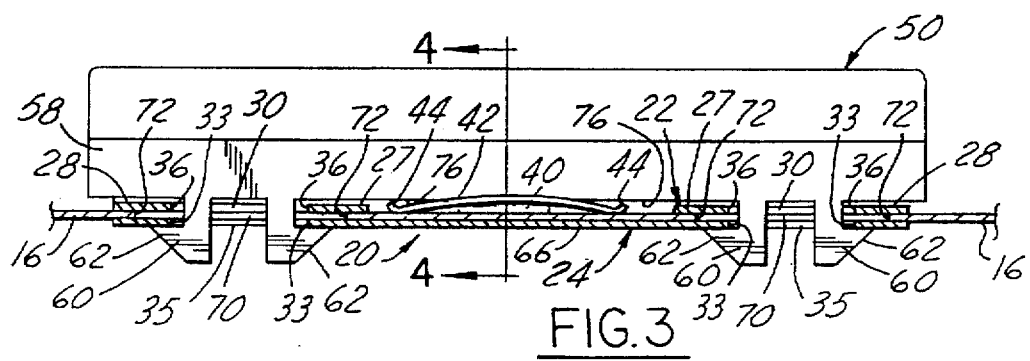
FIG. 3 is a fragmentary vertical cross sectional view of the clip taken on the line 3—3 of FIG. 4.

FIGS. 1 and 3 show the upper leg central gap, defined by edge 25, provided with an outboard extending upwardly inclined central neck portion 40 terminating in a longitudinally extending upwardly bowed leaf spring 42. As indicated in FIG. 3 the leaf spring 42 is formed symmetrical about a transverse vertical plane of symmetry defined by axis "A". The spring 42 is formed at its fore and aft ends with upwardly radiused downwardly convex skid-like bends 44 adapted for sliding line-contact with the upper surface of flange 16 upon the spring being resiliently compressed downwardly in a manner explained below.

It will be noted in FIG. 1 that a central portion of the clip bight 21 is lanced-out at 46 forming an upwardly curved lip 48. The curved lip is adapted to be engaged by the tip of a screwdriver or similar tool enabling ready inboard sliding removal of the clip 20 from the free edge 18 of fender flange 16.

FIG. 1 shows a right hand end portion of a transversely extending louvered cowl plastic panel, indicated generally at 50. The cowl plastic panel 50 comprises a contoured panel portion 52, defining an exterior design surface 53, bordered with downwardly extending forward 54 and aft 56 side walls and right and left end walls 58 and 59. As seen in FIG. 6 the plastic panel 50 is formed symmetrical about a longitudinally extending vertically disposed plane of symmetry which includes the vehicle longitudinal centerline axis "B". Accordingly, as the structure for the right hand side of the plastic panel 50 and its attaching clip 20 is a mirror image of the left hand side of the plastic panel and its attaching clip 20 only the right hand side structure will be shown and described.

Figure 7:
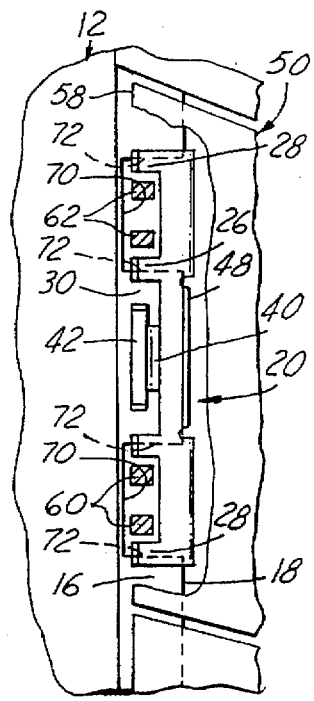
FIG. 7 is an enlarged fragmentary view of the right hand end of the plastic panel and its attaching clip 20 shown within the circle of FIG. 6 denoted by the numeral 7.

As seen in FIG. 3 forward and aft pairs of resilient mirror locking prongs 60—60 and 62—62 are integrally molded with the cowl plastic panel end wall 58 and extend downwardly therefrom. The fender panel attaching flange 16 is shown in FIG. 5 having its free edge 18 formed with a pair of identical fore and aft rectangular-shaped cutouts 70—70. As viewed in FIG. 7 the flange cutouts 70—70 are oversize relative to the clip upper and lower end notches 30 and 35. Thus, the cutouts 70—70 have their respective pairs of opposed side edges 72—72 longitudinally spaced apart a predetermined dimension greater than their associated upper leg end notches 30 and lower leg matching end notches 35.

As a result each pair of prongs 60—60 are adapted to deflect toward each other as their tapered edge faces 62 ride over their associated tang side edges 36—36 and lower leg notch side edges 36—36. Further, by forming the body flange edge cutouts 70 with longer side edges 72 than the upper leg end notches 30 and lower leg end notches 35 the plastic panel 50 is provided with additional clearance space for the prongs 60 upon the plastic panel thermally expanding outboard.

In operation, to attach the plastic cowl panel 50 to the vehicle, an attachment clip 20 is secured to each fender panel downwardly offset, horizontally disposed, inboard extending mounting flange inboard free edge 18 as seen in FIG. 2. Next, the cowl panel associated pair of fore and aft flexible locking prongs 60—60 are deflected toward each other as their tapered edge faces 62 ride over their associated notch side edges 36. Upon hook 64 of each prong edge face 62 riding over its associated side edge 36 until each hook 62 passes by its edge 36 allowing the prongs 60 to spring back. This locks each prong pair of horizontal shoulders 65 against underside 66 of the clip lower leg 24.

Figure 4:
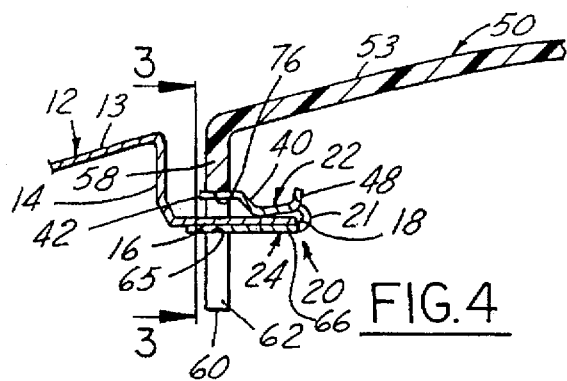
FIG. 4 is a fragmentary vertical sectional view of an attachment clip securing a plastic panel end wall to a metal body panel flange taken on the line 4—4 of FIG. 3.

With reference to FIG. 4 it will be seen that with the prong shoulders 65 in contact with the undersurface 66 of the clip lower leg 24 the clip leaf spring 42 has a predetermined height causing it to be compressed by opposed horizontal edge 76 of the panel end wall 58. By virtue of each assembled clip spring 42 being maintained under compression by an end wall edge 76 the spring force acts upwardly on the panel 50 urging the plastic panel upper surface 52 in flush relation with adjacent exterior surfaces 53 of the fender panel 12. As the compressed leaf spring 42 also biases the prong shoulders 65 into contact with the clip lower leg undersurface 66 the spring 42 maintains the panel 50 in fixed resilient contact with the clip 20.

At the same time the panel right end flange 58 is lockingly engaged to the body right hand fender panel attaching flange by the clip 20 the panel left hand end flange (not shown) is lockingly engaged in an identical manner to the left hand fender panel attaching flange. It will be appreciated that both the right and left hand clips must be attached to secure the panel 50. Thus, the panel is adapted to be readily removed from the vehicle body upon either of the clips 20 being detached from its associated fender panel. It will be noted that either clip 20 may be readily removed by means of a screw driver or similar tool being used to engage the curled flange 48 and sliding the clip inboard until it clears the fender panel attaching flange 16.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. In combination with a vehicle body having transversely spaced apart right and left side body panels, said body panels terminating in defining a pair of longitudinally extending opposed flange edges, each said flange edge formed with longitudinally spaced fore and aft rectangular-shaped cutouts, a pair of press-on attachment clips adapted for securing respective right and left outboard ends of a plastic panel to an associated inboard extending horizontally disposed mirror image flange, the combination comprising:

each clip having a generally U-shape formed from resilient sheet material having a longitudinally elongate, generally bifurcated configuration with a transverse axis of symmetry and defining an upper contoured leg and a lower planar leg, said legs having inboard ends thereof joined by a bight wall;

said upper leg having an inner pair of outboard extending longitudinally spaced fore and aft tangs, defining a central gap therebetween which overlies a lower leg elongated central tab portion, said upper leg terminating at its fore and aft ends in an outer pair of outboard extending end tangs having parallel side edges, each said end tang overlying a lower leg end tab portion with said end tang side edges in matched relation to associated side edges of an associated lower leg and tab portion, whereby each said fore and aft inner tang and its associated fore and aft end tang of said upper leg defining therebetween a pair of upper leg end notches with their side edges in matched relation to a pair of lower leg end notches;

each clip end notch so sized and shaped such that upon said clip being mounted on an associated clip out end notch body panel flanged edge, each clip upper and lower leg outer pair of end notches are centered with one of said fore and aft cutouts, each said cutout defining a pair of opposed side edges spaced apart a predetermined longitudinal dimension greater than opposed side edges of each said clip end notch;

said plastic panel having each outboard end thereof formed with fore and aft integral pairs of mirror image depending resilient locking prongs, each said prong formed with a taper face terminating in a horizontal shouldered surface, whereby with each said attaching clip mounted on said attaching clip's associated flange edge said plastic panel having each end fore and aft pair of locking prongs vertically aligned with an associated clip pair of upper and lower leg end notches and a flange fore and aft cutout so as to be initially received therein, such that an installer pushing downwardly on the plastic panel causes each pair of prongs to deflect as each prong tapered edge face rides over said prong tapered edge face's respective end notch opposed side edges, such that each pair of locking prongs will spring back in a snap-in manner with their respective shoulder surfaces in locked contact with an undersurface of said locking prong's associated clip lower leg.

2. The combination as set forth in claim 1 wherein each said clip upper leg having a spring member adapted to be compressed by an opposed horizontal edge of an associated plastic panel downwardly extending end wall upon each plastic panel prong locking shoulder engaging an underside of said spring member's associated clip lower leg thereby resiliently urging an exterior surface of said plastic panel in flush relation with an adjacent body panel portion exterior surface.

3. The combination as set forth in claim 2 wherein each said spring member in the form of a longitudinally extending leaf spring integrally supported in a cantilevered manner with said spring member's associated clip upper leg.

4. The combination as set forth in claim 1 wherein the body panel attaching flange is offset downwardly from said body panel's associated body panel a predetermined dimension whereby upon each said plastic panel outboard end being locked to an associated attaching flange said plastic panel having an exterior surface located in flush relation with an adjacent body panel portion exterior surface.

5. The combination as set forth in claim 4 wherein said body panels are right and left hand front fender panels and said plastic panel is a cowl panel of the vehicle.

6. The combination as set forth in claim 1 wherein said plastic panel is adapted to be readily removed from said body panels upon each said clip being released from its associated flange edge by merely sliding each clip inboard.

7. The combination as set forth in claim 6 wherein each clip having a central elongated portion of its bight wall lanced and bent upwardly in a convex inboard curved manner adapted to be engaged by a tool to facilitate removal of the clip.

8. The combination as set forth in claim 1 wherein each body panel attaching flange cutout defining a pair of opposed parallel side edges having a predetermined greater length than its associated clip end notch side edges, thereby providing additional space for transverse thermal expansion of said plastic panel.

9. An attachment clip comprising:

a resilient sheet metal clip of generally U-shape having a longitudinally elongate, bifurcated configuration with a transverse axis of symmetry and defining an upper contoured leg and a lower planar leg, said legs having inboard ends thereof joined by a bight wall;

said upper leg having an inner pair of outboard extending longitudinally spaced fore and aft central tangs defining a central rectangular-shaped elongated gap therebetween, said upper leg overlying an elongated lower central tab portion, said upper leg terminating at said support leg's fore and aft ends in an outer pair of outboard extending end tangs having parallel side edges, each said end tang overlying a lower leg end tab portion with said end tang side edges in matched relation to respective side edges of associated end tab portion;

each said fore and aft upper leg inner tang and said leg's associated fore and aft end tang defining therebetween a pair of upper leg end notches, each said fore and aft lower leg end tab and fore and aft side edges of said elongated central tab defining a pair of lower leg end notches, wherein said upper leg end notches having their side edges in matched relation to associated side edges of said pair of lower leg end notches;

said clip upper leg central gap defining a longitudinally extending free edge provided with an outboard extending upwardly inclined central neck portion terminating in a longitudinally extending upwardly bowed leaf spring symmetrically disposed about said transverse axis, said leaf spring overlying said lower leg elongated tab and having its fore and aft ends upwardly radiused defining downwardly convex bends spaced from an upper surface of said elongated tab.

* * * * *